United States Patent
Chiu

(10) Patent No.: US 10,086,939 B2
(45) Date of Patent: Oct. 2, 2018

(54) PLUG-AND-PLAY MULTIFUNCTIONAL ATTACHMENT OF REMOTE CONTROL ROTORCRAFT

(71) Applicant: Chien-Kai Chiu, New Taipei (TW)

(72) Inventor: Chien-Kai Chiu, New Taipei (TW)

( * ) Notice: Subject to any disclaimer, the term of this patent is extended or adjusted under 35 U.S.C. 154(b) by 282 days.

(21) Appl. No.: 14/951,510

(22) Filed: Nov. 25, 2015

(65) Prior Publication Data

US 2017/0144759 A1    May 25, 2017

(51) Int. Cl.
*B64D 1/02*     (2006.01)
*B64C 39/02*    (2006.01)

(52) U.S. Cl.
CPC .............. *B64D 1/02* (2013.01); *B64C 39/024* (2013.01); *B64C 2201/024* (2013.01); *B64C 2201/128* (2013.01); *B64C 2201/146* (2013.01)

(58) Field of Classification Search
CPC .......... B64D 39/024; B64D 1/12; B64D 1/22; B64D 1/02; B64C 2201/024; B64C 2201/128; B64C 2201/146; B64C 39/024; B64C 2201/027; A63H 27/04; A63H 27/004
See application file for complete search history.

(56) References Cited

U.S. PATENT DOCUMENTS

| | | | | | |
|---|---|---|---|---|---|
| 2,359,275 | A | * | 9/1944 | Anderson | B64D 1/22 258/1.2 |
| 2,368,671 | A | * | 2/1945 | Lombard | B64D 1/02 294/82.34 |
| 2,940,793 | A | * | 6/1960 | Benson | B64D 1/02 294/82.33 |
| 3,056,624 | A | * | 10/1962 | Nardone | B64D 1/22 294/82.3 |
| 3,061,355 | A | * | 10/1962 | Cozzoli | B64D 1/22 258/1.2 |
| 3,163,401 | A | * | 12/1964 | Johnston | B64D 1/22 258/1.2 |
| 3,174,790 | A | * | 3/1965 | Bendl | B64D 1/22 294/104 |
| 3,194,598 | A | * | 7/1965 | Goldfuss | B64D 1/22 24/599.8 |
| 3,494,248 | A | * | 2/1970 | Wenger | B64D 1/02 244/137.4 |

(Continued)

FOREIGN PATENT DOCUMENTS

| | | | | |
|---|---|---|---|---|
| DE | 102010031750 A1 | * | 1/2012 | .............. B64D 1/02 |
| EP | 2738093 A1 | * | 6/2014 | ........... B64C 39/024 |

(Continued)

*Primary Examiner* — Magdalena Topolski
(74) *Attorney, Agent, or Firm* — Leong C. Lei

(57) ABSTRACT

A plug-and-play multifunctional attachment of a remote control rotorcraft, which includes: an attachment body that includes a device board and a remote control receiver unit. The device board has a top surface to which a first coupling member is mounted. The remote control receiver unit is mounted to and electrically connected to a bottom surface of the device board. Wireless transmission of a signal is enabled between a remote control device and the remote control receiver unit. A second coupling member is mounted to a bottom of an unmanned aircraft to enable selective engagement and coupling between the second coupling member and the first coupling member.

3 Claims, 7 Drawing Sheets

(56) References Cited

U.S. PATENT DOCUMENTS

| | | | | |
|---|---|---|---|---|
| 3,533,655 A * | 10/1970 | Harley | .................... | A62B 1/04 |
| | | | | 294/82.34 |
| 3,630,562 A * | 12/1971 | Metz | ...................... | B64D 1/22 |
| | | | | 294/82.33 |
| 3,690,602 A * | 9/1972 | Marsh | ..................... | B64D 1/22 |
| | | | | 244/137.4 |
| 9,321,531 B1 * | 4/2016 | Takayama | ................ | B64D 1/12 |
| 9,422,139 B1 * | 8/2016 | Bialkowski | ........... | B64C 39/024 |
| 9,650,136 B1 * | 5/2017 | Haskin | ..................... | B64D 1/12 |
| 9,725,168 B2 * | 8/2017 | Kim | ........................ | B64C 39/02 |
| 9,725,173 B2 * | 8/2017 | Cernko | .................... | B64D 1/02 |
| 2003/0057325 A1 * | 3/2003 | Carroll | .................. | B64C 39/024 |
| | | | | 244/120 |
| 2003/0060944 A1 * | 3/2003 | Carroll | .................. | B64C 39/024 |
| | | | | 701/3 |
| 2003/0066932 A1 * | 4/2003 | Carroll | .................. | B64C 39/024 |
| | | | | 244/120 |
| 2016/0183514 A1 * | 6/2016 | Dederick | .............. | A01M 29/06 |
| | | | | 119/713 |
| 2016/0236346 A1 * | 8/2016 | Lee | ........................... | B25J 9/10 |
| 2017/0174343 A1 * | 6/2017 | Erickson | ............... | B64C 39/024 |
| 2017/0253333 A1 * | 9/2017 | Baudet | .................. | B64C 39/024 |
| 2017/0329351 A1 * | 11/2017 | Park | ....................... | G05D 1/101 |
| 2017/0338455 A1 * | 11/2017 | Qiu | ....................... | B64C 39/024 |

FOREIGN PATENT DOCUMENTS

| | | | | |
|---|---|---|---|---|
| EP | 2774848 A1 * | 9/2014 | ............... | B64D 9/00 |
| EP | 3210659 A1 * | 8/2017 | ............. | B64C 27/08 |
| WO | WO-2016034819 A1 * | 3/2016 | ........... | B64C 39/024 |
| WO | WO-2017077531 A1 * | 5/2017 | ............. | B64C 39/02 |

* cited by examiner

US 10,086,939 B2

PLUG-AND-PLAY MULTIFUNCTIONAL ATTACHMENT OF REMOTE CONTROL ROTORCRAFT

TECHNICAL FIELD OF THE INVENTION

The present invention relates generally to an attachment device, and more particularly to a multifunctional attachment device that is easily and efficiently installable on all types of single-rotor or multiple-rotor remote control aircraft.

DESCRIPTION OF THE PRIOR ART

With the progress of science and technology, the development of techniques related to large-sized aircrafts has been gradually getting mature recently. Most of the researchers and scholars are now turning their attention to the development of small-sized unmanned aircrafts. Some of the most interesting topics are the so-called micro aerial vehicles (micro air vehicles) and the unmanned vehicles that are currently prevailing. The reasons that people are interested in the micro air vehicles and the unmanned vehicles are their military applications, including investigation and raids and they are also applicable to various types of operations, such as search and rescue of lost persons. All these illustrate the extremely high value for research and study. The unmanned aircrafts that are currently under developments are generally based on the structure of helicopters; however, most of the unmanned aircraft, when set in operation, provides no function in addition to flying and hovering, although few additional functions may be involved for certain specific tasks, such as lighting and photographing and/or video recording. Generally speaking, if an additional function is desired, the unmanned aircraft must be modified generally by the owners or users and setting up an additional function or device on the unmanned aircraft is generally constrained by a remote control device of the unmanned aircraft. This is generally inconvenient and may not broadly suit all sorts of needs.

SUMMARY OF THE INVENTION

The present invention provides a plug-and-play multifunctional attachment device of a remote control rotorcraft, which comprises: an attachment body that comprises a device board and a remote control receiver unit. The device board has a top surface to which a first coupling member is mounted. The remote control receiver unit is mounted to and electrically connected to a bottom surface of the device board. Wireless transmission of a signal is enabled between a remote control device and the remote control receiver unit. A second coupling member is mounted to a bottom of an unmanned aircraft to enable selective engagement and coupling between the second coupling member and the first coupling member.

The plug-and-play multifunctional attachment device of the remote control rotorcraft according to the present invention achieves a primary purpose of providing an efficiently replaceable attachment module that can be adopted for various types of remote control machines without modification of the machines.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
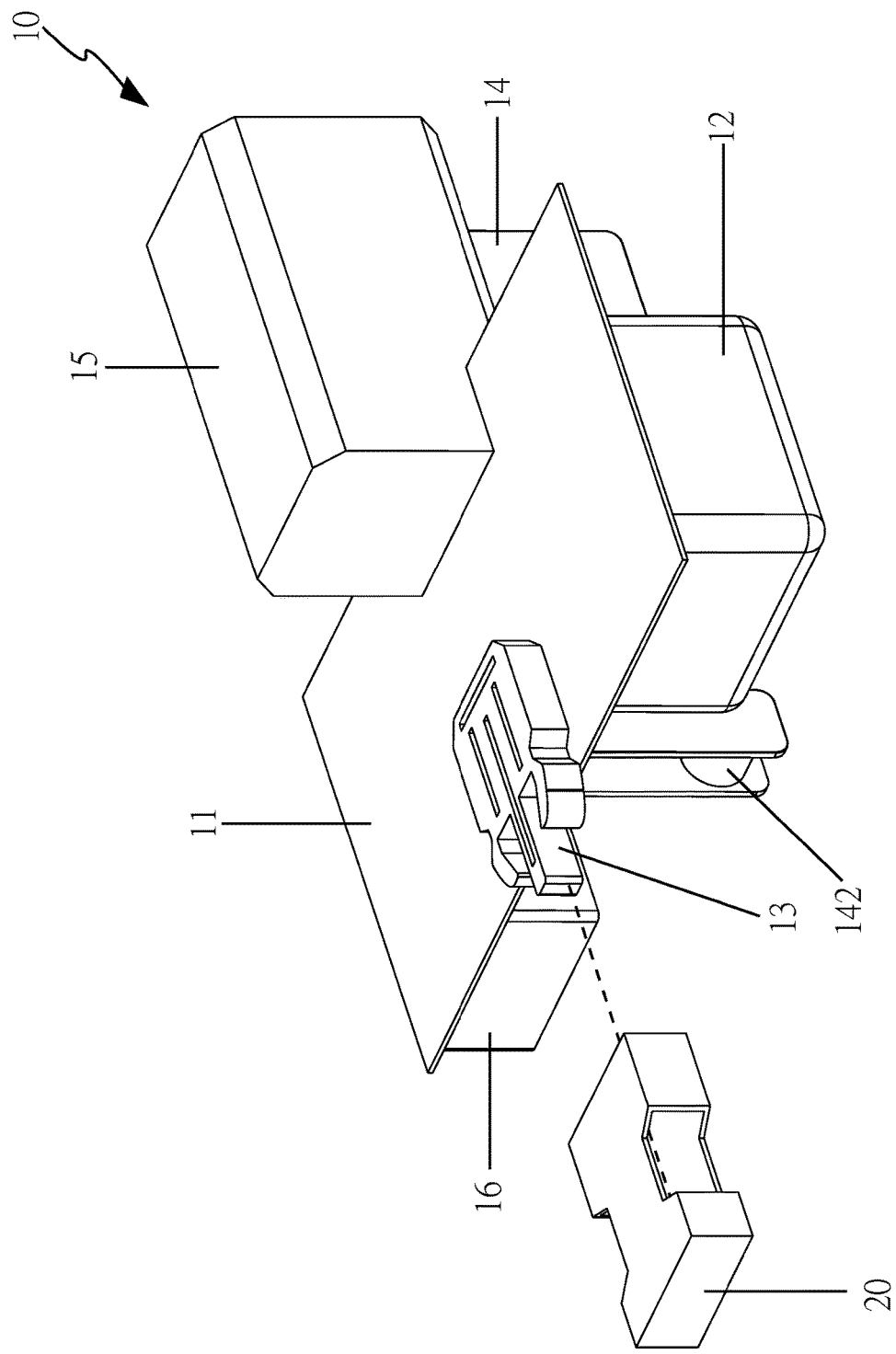
FIG. 1 is a perspective view of the present invention.

Referring to FIG. 1, the present invention provides a plug-and-play multifunctional attachment of a remote control rotorcraft, which comprises: an attachment body 10 and a second coupling member 20, of which components and/or parts and spatial relationships thereof will be described in detail in the following.

Figure 2:
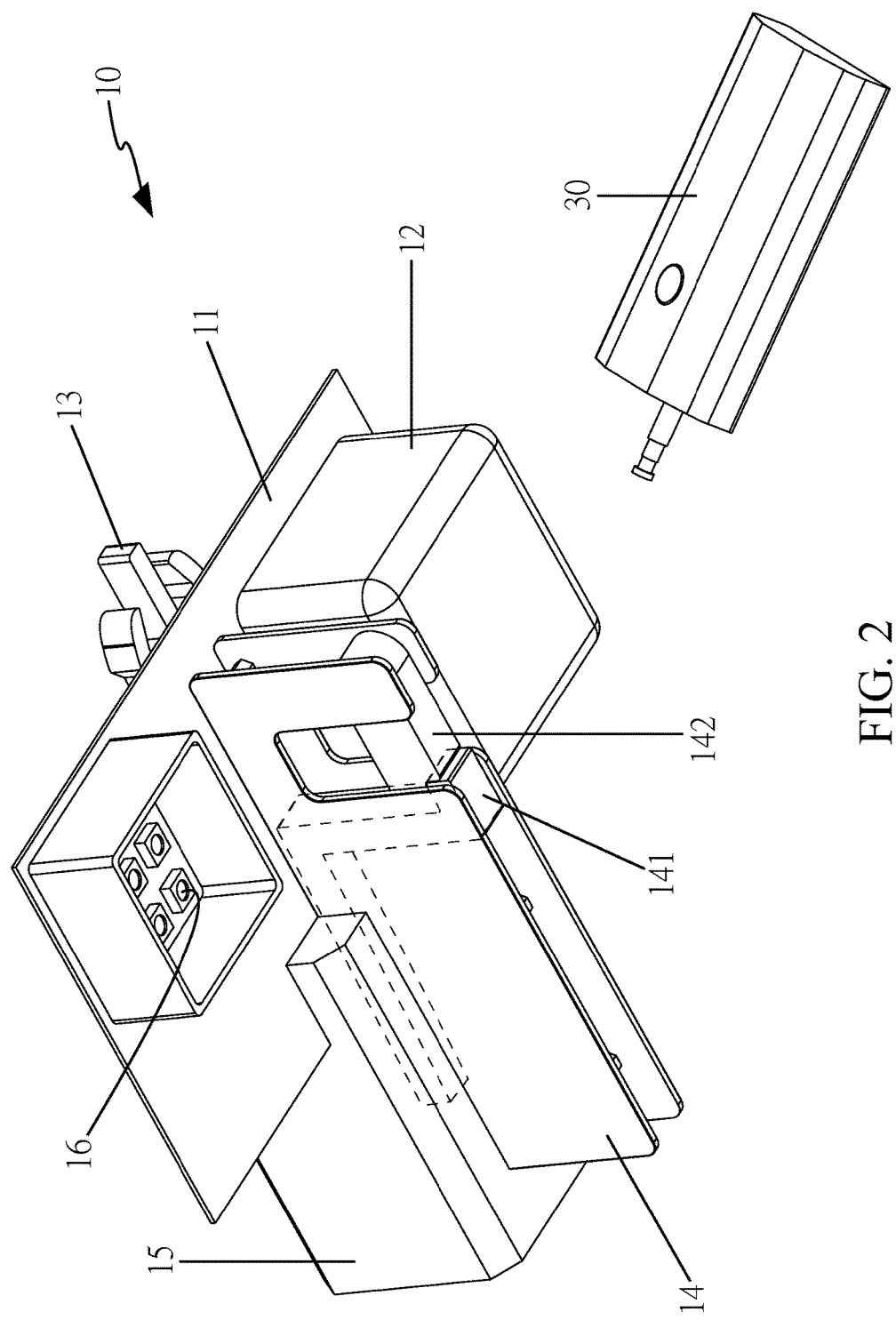
FIG. 2 is a perspective view of the present invention taken from a different angle.

Referring to FIG. 2, the attachment body 10 comprises a device board 11, which may include a circuit board or is a circuit board itself, and a remote control receiver unit 12. The device board 11 has a top surface to which a first coupling member 13 is mounted. The remote control receiver unit 12 is mounted to and electrically connected to a bottom surface of the device board 11. A remote control device 30 may be used for transmission of wireless or radio signals, in a wireless manner, with the remote control receiver unit 12.

Referring to FIGS. 1 and 2, the device board 11 of the attachment body 10 further comprises a dropping mechanism 14 and a power unit 15 mounted to the bottom surface thereof The dropping mechanism 14 comprises a slidable bar 141 and a retainer member 142. The slidable bar is coupled to the power unit 15 to have the slidable bar 141 reciprocally movable. The retainer member 142 has an end pivotally connected to the dropping mechanism 14 and an opposite end set in retained engagement with the slidable bar 141.

Further, the device board 11 may also comprise at least one light emission element 16 and a switch element 17 mounted to and electrically connected with the bottom surface thereof When the remote control device 30 transmits a signal to the remote control receiver unit 12, the light emission element 16 is activated to give off light. The switch element 17 is provided for activating or de-activating the operation of the attachment body 10.

Figure 3:
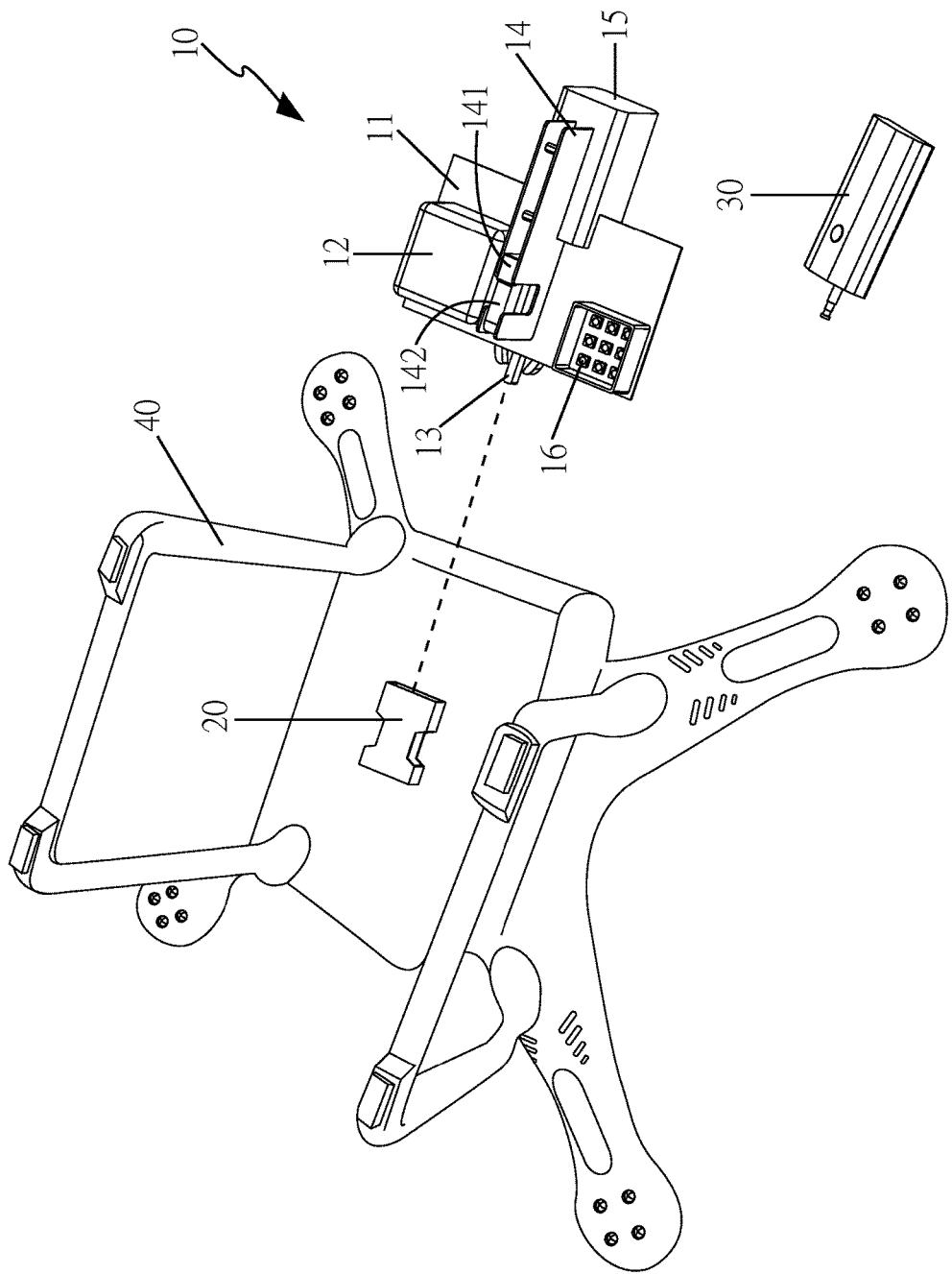
FIG. 3 is a schematic view illustrating assembly of the present invention.

Referring to FIG. 3, the second coupling member 20 is provided for being mounted to or coupled to a bottom of an unmanned aircraft 40 (which is the remote control rotorcraft) for enabling coupling engagement and connection between the second coupling member 20 and the first coupling member 13. In the instant embodiment, the first coupling member 13 and the second coupling member 20 are generally and respectively in the form of a male buckling part and a female buckling part, which enable releasable and removable coupling therebetween.

Figure 4:
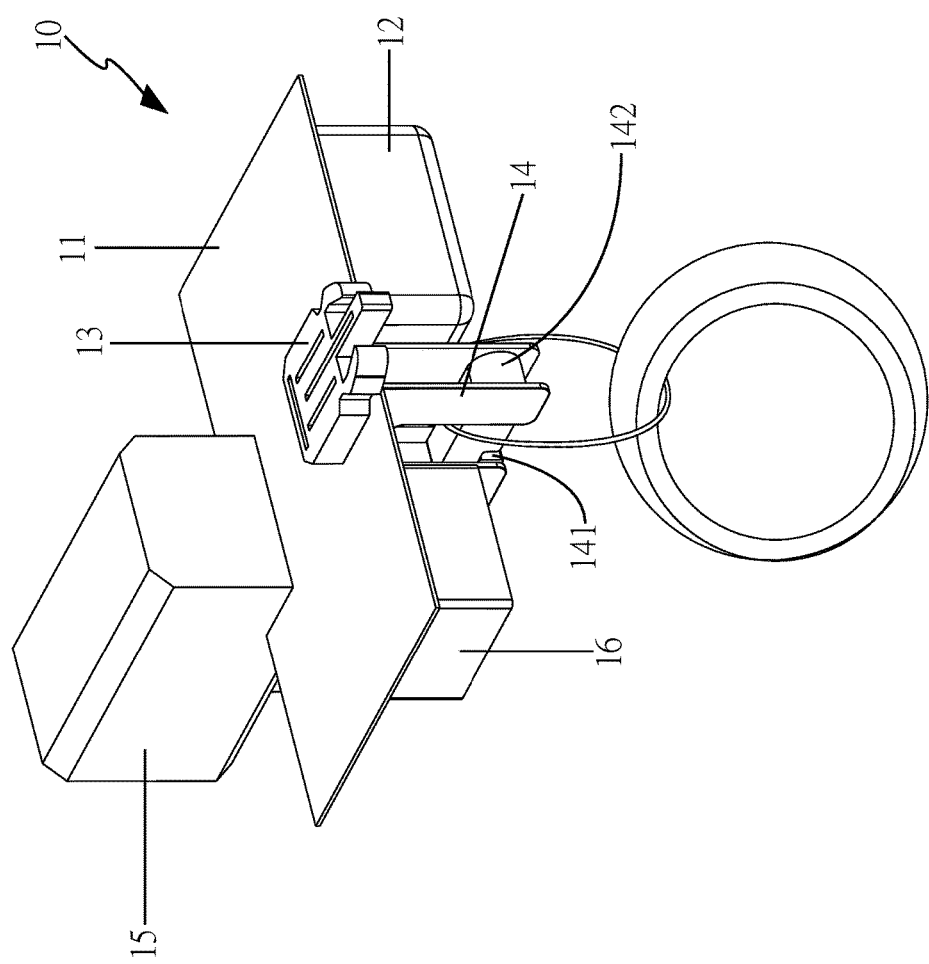
FIG. 4 is a schematic view illustrating use of the present invention.
Figure 5:
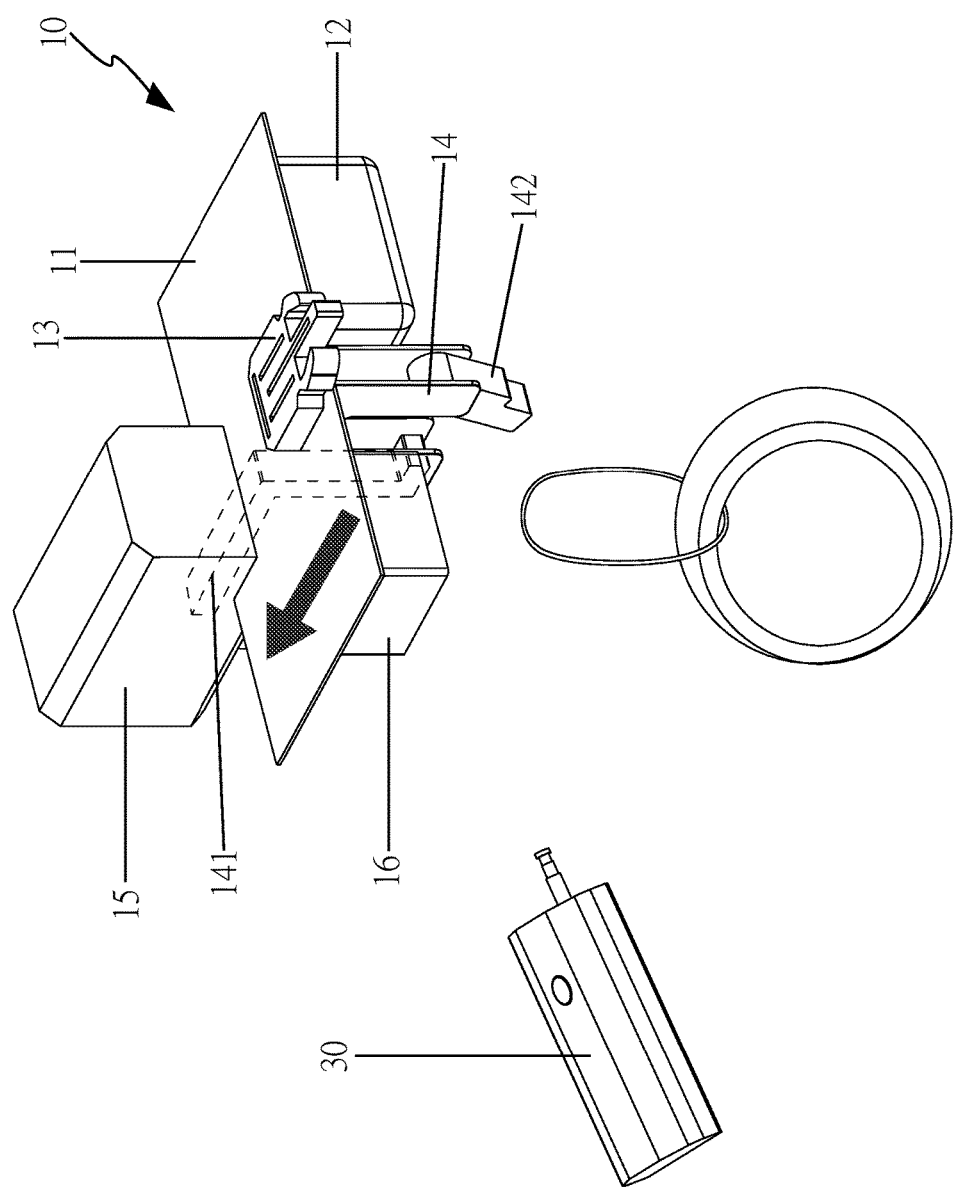
FIG. 5 is a schematic view, in association with FIG. 4, illustrating the use of the present invention.

Referring to FIGS. 4 and 5, in use, the retainer member 142 provides a function for suspending and thus retaining an object A thereon. The remote control device 30 may be operated to cause the slidable bar 141 to move into retaining engagement with and coupling with the retainer member 142 so that the object A is suspended and retained on the retainer member 142. When the unmanned aircraft 40 has flown to a desired location and a desired height, the remote control device 30 may be operated to transmit a signal to the remote control receiver unit 12 to have the power unit 15 drive the slidable bar 141 to move in such a way that the retainer member 142 disengages from the slidable bar 141 to allow the object A to drop. This may be used in dropping supply for rescue, execution of rescue in water areas, and dispatching marine rescue equipment in an air-dropping manner.

Figure 6:
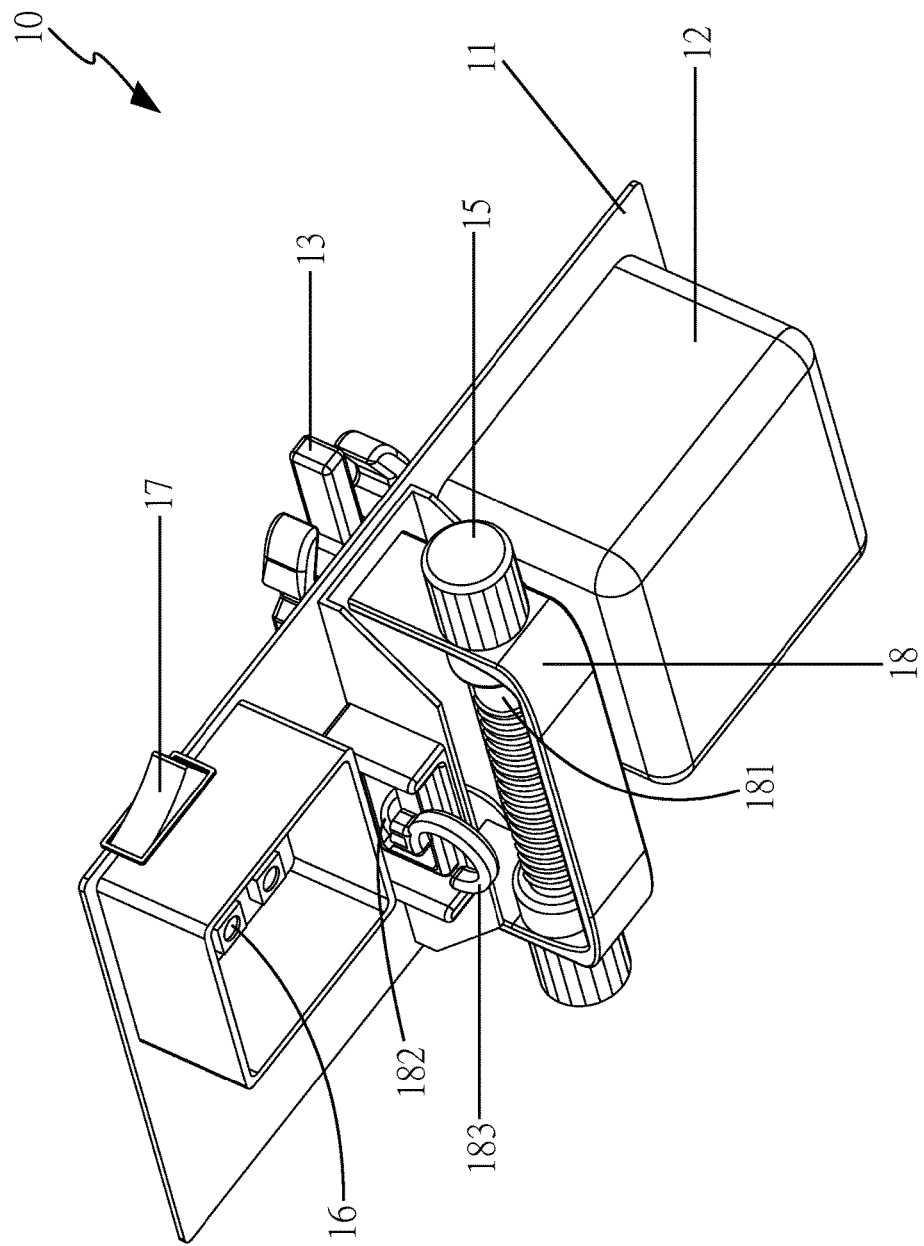
FIG. 6 is a perspective view illustrating another embodiment of the present invention.
Figure 7:
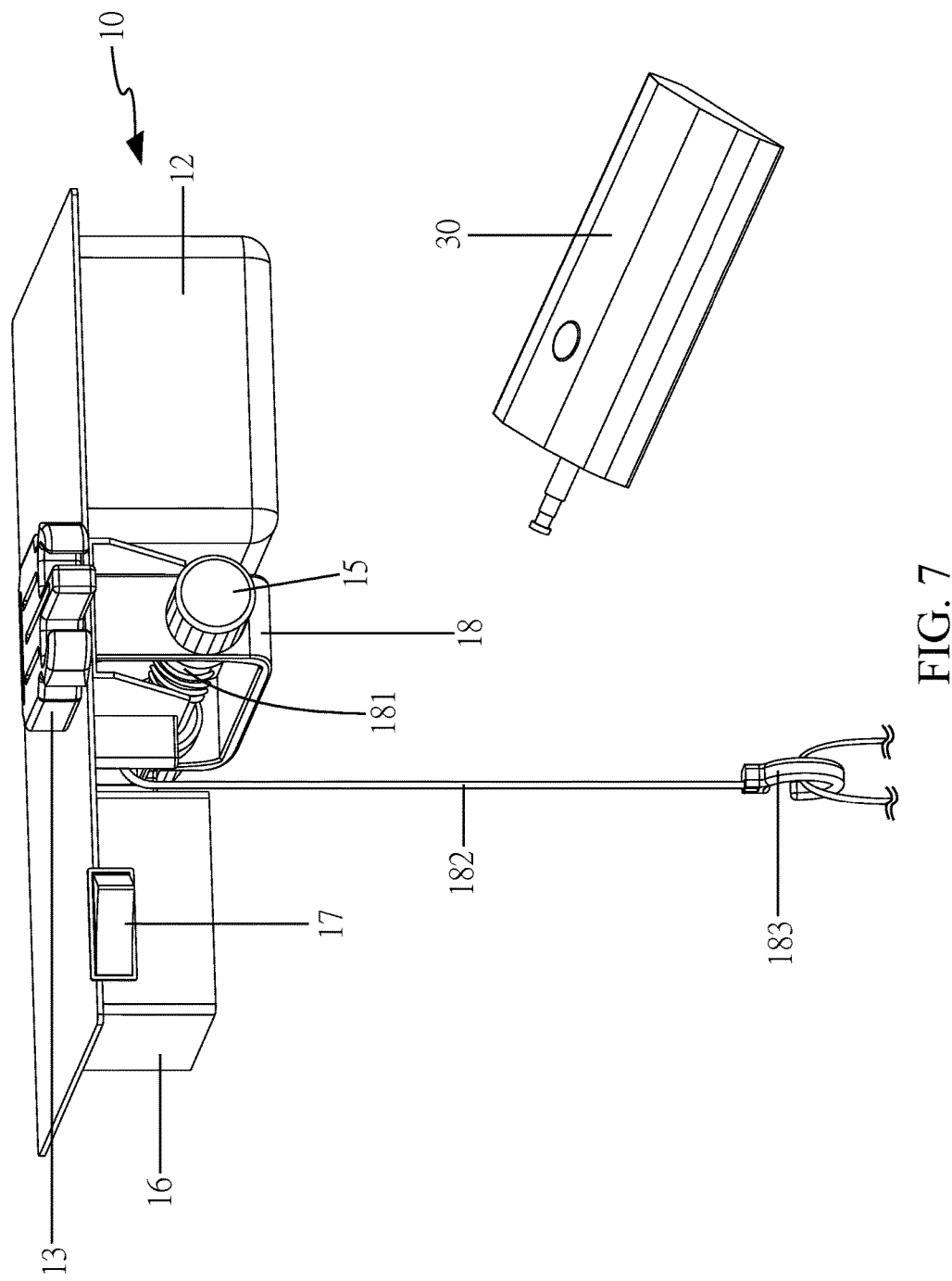
FIG. 7 is a schematic view, in association with FIG. 6, illustrating a condition of use thereof.

Referring to FIGS. 6 and 7, a second embodiment of the present invention is illustrated, which has a structure similar to that of the previous embodiment so that description of the similar parts will be omitted and only the illustration of the different parts will be given below.

In the instant embodiment, a lifting mechanism 18 is used to replace the dropping mechanism 14 of the previous embodiment. The lifting mechanism 18 is mounted to the bottom surface of the device board 11. The lifting mechanism 18 comprises an axle 181 and a cable 182. The axle 181 is coupled to the power unit 15. The cable 182 has an end coupled to the axle 181 and wound around the axle 181. An opposite end of the cable 182 is provided with a hook 183 or a ring (not shown) connected thereto.

The cable 182 provides a function of being coupled to an object A so that when the remote control device 30 transmits a signal to the remote control receiver unit 12, the power unit 15 is caused to drive the axle 181 to rotate to have the cable 182 descend to lower down the object A or to lift up the object A.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A plug-and-play multifunctional attachment device of a remote control rotorcraft, comprising:
   an attachment body, which comprises a device board and a remote control receiver unit, the device board having a top surface to which a first coupling member is mounted, the remote control receiver unit being electrically connected to a bottom surface of the device board, wherein wireless transmission of a signal is enabled between a remote control device and the remote control receiver unit; and
   a second coupling member, which is adapted to be mounted to a bottom of an unmanned aircraft so that the second coupling member is engageable with and coupled to the first coupling member;
   wherein the device board of the attachment body further comprises a dropping mechanism and a power unit mounted to the bottom surface thereof, the dropping mechanism comprising a slidable bar and a retainer member, the slidable bar being coupled to the power unit to enable reciprocal movement of the slidable bar, the retainer member having an end pivotally connected to the dropping mechanism and an opposite end selectively in engagement with and thus retained by the slidable bar for receiving an object suspended and retained on the retainer member, wherein when the remote control device transmits the signal to the remote control receiver unit, the power unit is caused to drive the slidable bar to move in such a way that the retainer member disengages and thus separates from the slidable bar to enable dropping of the object.

2. The plug-and-play multifunctional attachment device of the remote control rotorcraft according to claim 1, wherein the device board comprises at least one light emission element mounted to and electrically connected to the bottom surface thereof so that when the remote control device transmits the signal to the remote control receiver unit, the light emission element is caused to give off light.

3. The plug-and-play multifunctional attachment device of the remote control rotorcraft according to claim 1, wherein the device board further comprises a switch element electrically connected thereto.

\* \* \* \* \*